March 24, 1964 W. C. PARKINSON ETAL 3,126,172
AIRBORNE VEHICLE REMOTE CONTROL DEVICE
Filed May 19, 1950 9 Sheets-Sheet 1

FIG. I

INVENTORS
HAROLD E. OBER
WILLIAM C. PARKINSON
RICHARD B. ROBERTS
BY
ATTORNEY

March 24, 1964 W. C. PARKINSON ETAL 3,126,172
AIRBORNE VEHICLE REMOTE CONTROL DEVICE
Filed May 19, 1950 9 Sheets-Sheet 2

INVENTORS
HAROLD E. OBER
WILLIAM C. PARKINSON
RICHARD B. ROBERTS
BY
ATTORNEY

FIG. 3

March 24, 1964   W. C. PARKINSON ETAL   3,126,172
AIRBORNE VEHICLE REMOTE CONTROL DEVICE
Filed May 19, 1950                                      9 Sheets-Sheet 4

FIG. 4

INVENTORS
HAROLD E. OBER
WILLIAM C. PARKINSON
RICHARD B. ROBERTS
BY
ATTORNEY

United States Patent Office

3,126,172
Patented Mar. 24, 1964

3,126,172
AIRBORNE VEHICLE REMOTE CONTROL DEVICE
William C. Parkinson, Ann Arbor, Mich., Harold E. Ober, Silver Spring, Md., and Richard B. Roberts, Washington, D.C., assignors to the United States of America as represented by the Secretary of the Navy
Filed May 19, 1950, Ser. No. 162,902
24 Claims. (Cl. 244—14)

This invention relates generally to a method and means for remotely controlling an airborne vehicle. More particularly, the invention relates to a radio control system for controlling an airborne guided missile from a location remote from the missile.

With the development of the turbo-jet propelled aircraft for use as an offensive weapon in time of war, the burden of devising an effective countermeasure was thrust upon a potential defender. Because of the great speeds attainable by such aircraft, anti-aircraft shell fire was proven totally ineffective for the reason that in the time that elapses between the firing of an anti-aircraft shell and its arrival at a predicted collision point, the aircraft was capable of travelling a considerable distance. Existing aircraft defense was, therefore, rendered obsolete. To offset the advantages of the turbo-jet type aircraft, a remotely controlled guided missile which could follow the evasive maneuvers of such aircraft was needed.

A known method of remotely controlling airborne guided missiles was used during World War II with target planes, better known as drones. The drone control system involved the use of a visual observer who transmitted up, down, right, and left controlling signals to the airborne drone on four separate radio frequency carriers. This system proved impractical for use with anti-aircraft guided missiles, however, for the reason that four separate control channels and a separate observer were needed for each airborne missile. The limitations of the system were at once apparent in that the number of missiles which could be made airborne at a particular instant was limited by frequency allocation problems, and the response time of a missile to the evasive maneuvers of a target were too great. To overcome these objections, the system that comprises the present invention was developed.

The present invention constitutes a guidance system for instantaneously and simultaneously controlling a plurality of airborne guided missiles. The system consists of a means for establishing a beam of electromagnetic energy that may be moved in elevation and traverse azimuth in directing it upon a target, and that has the missile controlling intelligence modulated thereon. Additional means are mounted in the missile for detecting and utilizing such controlling intelligence to maneuver the missile.

It is, therefore, one object of the present invention to provide a means for remotely controlling an airborne vehicle.

Another object of the invention is to provide a guidance system for an airborne vehicle, wherein the time response of the vehicle to evasive maneuvers of a potential target is reduced to an absolute minimum.

A further object of the invention is to provide a guidance system by the use of which an unlimited number of airborne vehicles can be controlled simultaneously.

Other objects and many of the attendant advantages of this invention will be appreciated readily as the same becomes understood by reference to the following detailed description, when considered in connection with the accompanying drawings, wherein.

Figure 1:
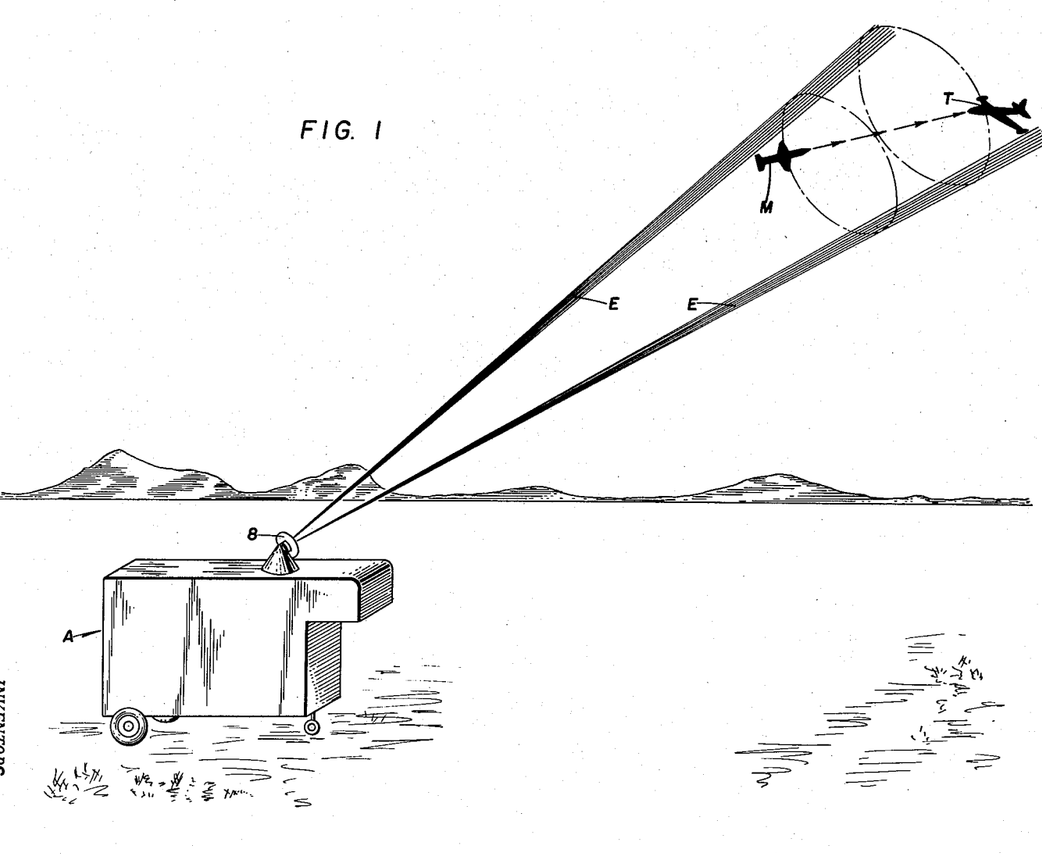
FIG. 1 is a diagrammatic representation illustrating a missile being guided toward a target by the system of the present invention.

Referring first to FIG. 1 of the drawings, the guidance system of the present invention includes a transmitter unit A situated on the ground or aboard ship, and a receiver unit mounted in the airborne missile M. The transmitter unit A emits a conically scanned beam of electromagnetic energy, indicated at E, which may be moved in elevation and traverse upon a target T, and on which the missile controlling intelligence is impressed. The receiver unit in missile M derives the controlling intelligence from the beam E, and utilizes it to retain the missile within beam E until such time that the missile M comes within lethal range of the target T.

Figures 2, 11:
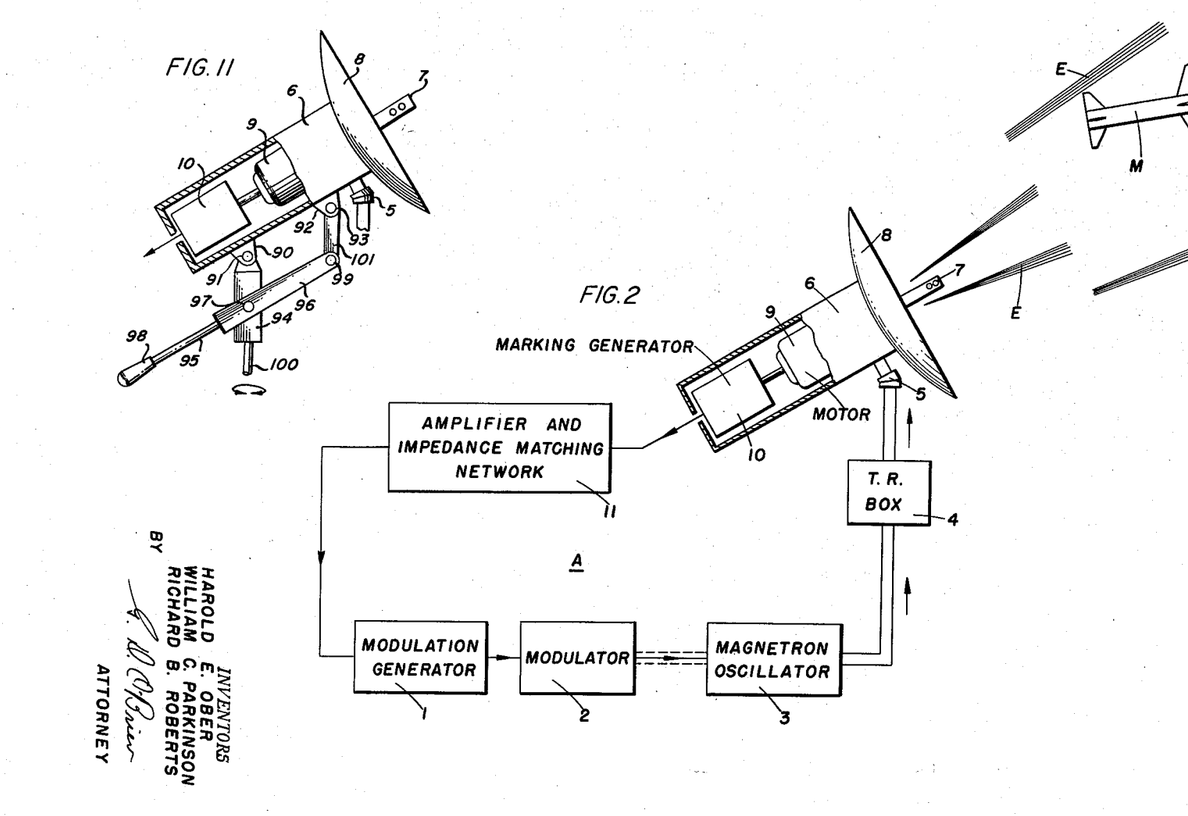
FIG. 2 is a block diagram of the transmitter section of the guidance system constituting the present invention, the antenna housing being broken away and parts shown in elevation.
FIG. 11 is a schematic of an arrangement for moving the beam of electromagnetic energy in elevation and traverse when tracking a target.
Figures 6, 6A:
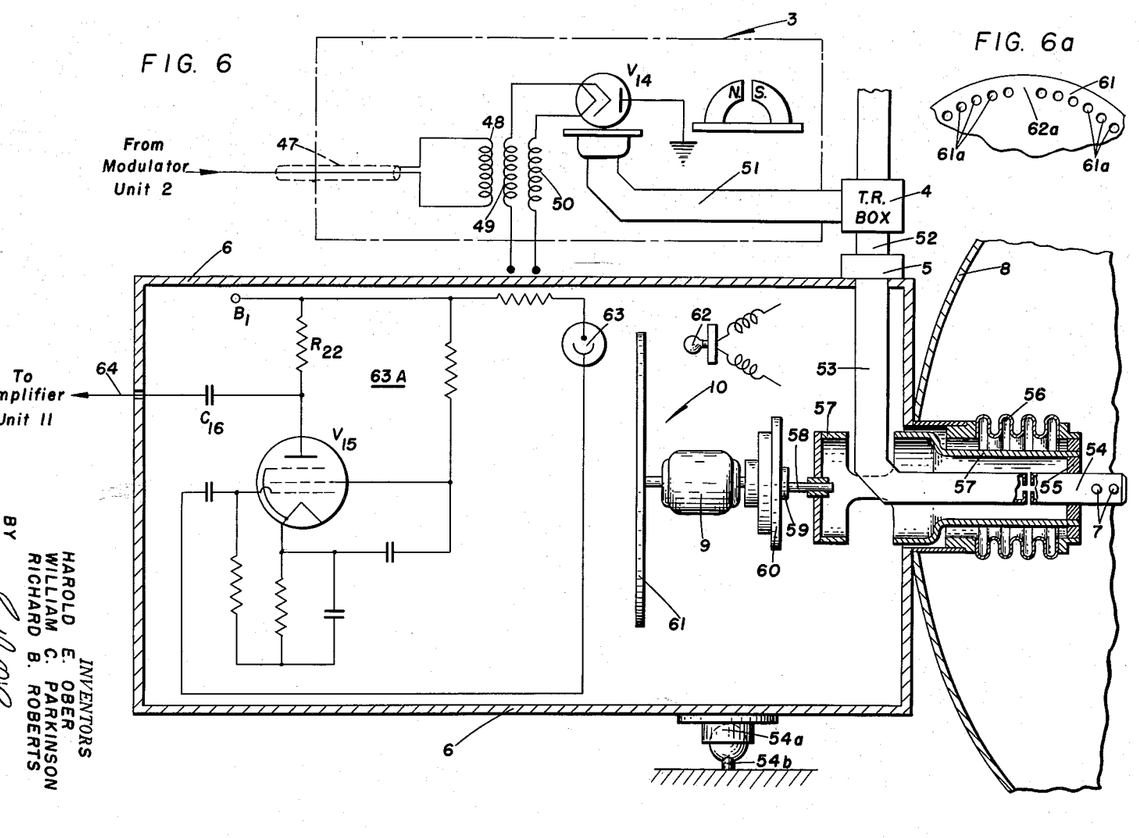
FIG. 6 is a schematic view showing the antenna position marking generator, the photo-cell amplifier and the magnetron oscillator, the antenna mounting housing and a portion of the antenna and reflector being shown in longitudinal section.
FIG. 6a is a detail plan view showing a fragment of the marking generator disc.

As is shown essentially in block diagram in FIG. 2, the transmitter unit A is constituted by a standard Mark 29 fire control radar modified for use in a missile guidance system. As modified, the unit comprises a modulation generator 1 having its output circuit connected to a pulse forming modulator 2. Pulse forming modulator 2 is connected through a coaxial transmission line to a radio frequency magnetron oscillator 3. The output of magnetron oscillator 3 is coupled through a wave guide section, a TR box 4, a pair of adjustable wave guide joints 5, and a flexible wave guide coupling, contained within a housing 6, to an antenna 7. As best seen in FIG. 6, antenna 7 is mechanically supported at the focal point of a parabolic reflector 8 which may be shifted in elevation and traverse upon a target. Any suitable arrangement or means can be provided for moving the beam E of electromagnetic energy in space for tracking a target in elevation and traverse. For example, the target can be tracked by the hand operated means illustrated in FIG. 11. This hand operated means includes a shaft 100 which is mounted for rotation about a vertical axis. This shaft 100 has an enlarged section 94 at its upper end on which there is pivotally mounted at point 97 an arm 96. This arm 96 has a reduced portion 95 and a handle 98 attached to the reduced portion of the arm. Housing 6 has attached thereto two brackets 90 and 92. The upper end 94 of the shaft 100 is pivotally connected to bracket 90 at 91, while the end of the arm 96 opposite the handle 98 is pivotally connected to a linkage member 101, which, in turn has its opposite end pivotally attached at 93 to bracket 92. In operation, by exerting a force on the handle 98 in a horizontal direction, the shaft 100 can be rotated in a clockwise or counterclockwise direction to move the housing 6 and thus the beam E in azimuth. If a vertical force is applied to the handle 98, the housing 6, through arm 96 and linkage member 101, can be moved in a vertical direction to elevate or lower the beam E to track the target. By exerting a force at an angle to the vertical and horizontal directions, the beam E can simultaneously be moved in elevation and traverse when tracking a target. Antenna 7 is driven by a motor 9 which imparts a nutating motion to the antenna through a flexible joint contained within housing 6. In addition to nutating the antenna 7, motor 9 also directly drives a marking generator 10 which, therefore, has its output synchronized with the nutating antenna 7, and which develops a submodulation synchronizing mark at an arbitrarily selected reference point in each nutation cycle of the antenna. This synchronized mark is superimposed on the beam E of electromagnetic energy radiated from antenna 7 by coupling the output of the marking generator 10 to the input of the modulation generator 1 through an amplifier and an impedance matching network 11.

Having briefly described the arrangement of the transmitter unit of the guidance system, its operation is as follows:

Modulation generator 1 produces a square wave modulating signal which is differentiated, amplified and applied to pulse modulator 2. Modulator 2 further shapes the modulating voltage and forms a high voltage triggering pulse having a repetition rate equal to that of the modulation generator 1. The pulsed wave thus produced is then used to trigger magnetron oscillator 3. The pulsed radio frequency signal generated by magnetron oscillator 3 is fed through the wave guide section TR box 4, joints 5, and the flexible wave guide joint contained within housing 6, to the antenna 7. The antenna 7 consists of a single dipole radiating element and a half wave reflector which limits direct forward radiation from the radiating element and concentrates the emitted energy back into the parabolic reflector 8, in the well known manner. Due to the nutation imparted to antenna 7 by motor 9, beam E is nutated about an axis passing through the focal point and vertex of reflector 8, and describes a cone of revolution. By establishing a reference plane on the cone of revolution thus described, the relative position of a missile M situated within the cone, with respect to this plane, can be determined by a suitable receiver R included in missile M. The information derived by such means can then be used to keep the missile M on the axis of nutation. The required reference plane is established by marking generator 10 which is directly driven by motor 9, and is, therefore, synchronized with nutation of the antenna 7. Marking generator 10 generates a receiver synchronizing mark at an arbitrarily selected point in the circle described by antenna 7 in one nutation cycle, and, because the angular position of the nutating beam at any instant in a nutation cycle is dependent upon the angular position of said antenna 7, the marking signal can be used to establish a reference plane in the cone of revolution described by said beam E in one nutation cycle. In order that this be done, the synchronizing mark is coupled through impedance matching network 11 to the input of modulation generator 1 in which it is superimposed on the output thereof. In this manner, the said synchronizing mark is submodulated on the nutating beam E of electromagnetic energy emitted by antenna 7, and serves to establish a reference plane in the cone of revolution described by said nutating beam.

Figure 3:
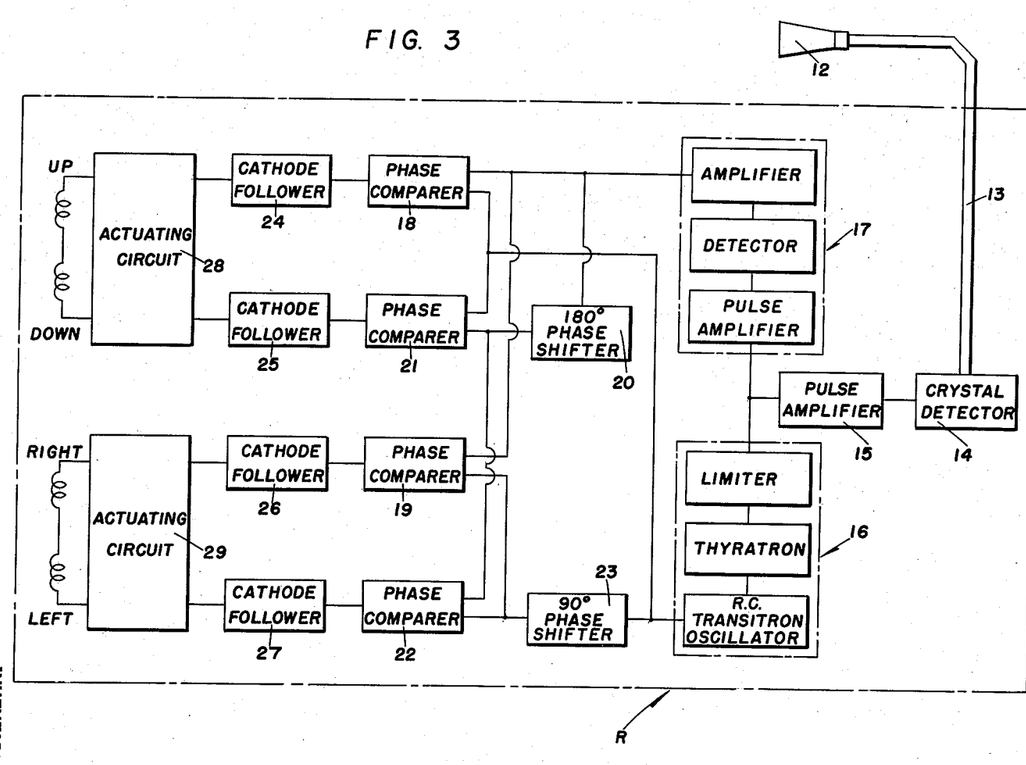
FIG. 3 is a block diagram of the receiver section of the system.

Referring now to FIG. 3, wherein the receiver unit R is shown in block diagram, said receiver unit consists of an electromagnetic energy receiving horn 12 which is coupled through a wave guide section 13 to a crystal detector 14. The output of crystal detector 14 is connected to a pulse amplifier 15 having its output connected in parallel to two separate channels; a synchronizing channel 16 and a beam interception detection channel 17. Synchronizing channel 16 comprises a limiter having its output coupled to the control grid of a thyratron discharge tube. The output of the thyratron tube is connected to an RC transitron oscillator tuned to the nutation frequency of the beam, and having its output coupled directly to a plurality of phase comparing circuits 18 and 21 in which it is combined with the signal derived in beam interception channel 17, and through a 90° phase shifting network 23 to phase comparers 19 and 22.

Beam interception detection channel 17 comprises a pulse amplifier having its output coupled to a detector. The detector is tuned to the frequency of nutation and has the output thereof connected to an amplifier also tuned to the nutation frequency. The output of said amplifier is coupled directly to a pair of phase comparing circuits 18 and 19 and, through a 180° phase shifting network 20, to a second pair of phase comparing circuits 21 and 22.

Upon the missile M in which the receiver is mounted becoming displaced from the axis of the cone of revolution described by the nutating beam E, the signal received by horn 12 and fed to detector 14 will vary from a maximum, present at the instant that the maximum lobe of the beam is pointing at the missile, to a minimum when the beam has nutated 180° away from the missile. The superimposed amplitude modulation will have an amplitude dependent upon the distance that the missile M is off the axis of the beam E, and a phase dependent upon the angular position of the missile relative to the reference plane established by the submodulation synchronizing mark. Thus, the received signal comprises a pulsed radio frequency wave that is amplitude modulated at a frequency equal to the nutation frequency of the beam E, and submodulated by the synchronizing mark. Upon detection, an amplitude modulated pulse signal submodulated by said synchronizing mark is derived and amplified by amplifier 15, and then is fed to synchronizing channel 16 and to beam interception detection channel 17.

In the synchronizing channel 16, the impressed amplitude modulation is erased by the limiter and a pulse signal having only the submodulation synchronizing mark imposed thereon is passed. The limited signal is then fed to the control grid of the thyratron which, upon the occurrence of the submodulation synchronizing mark, is driven sufficiently positive to allow said thyratron to conduct. The pulsed voltage resulting from the flow of current through said thyratron is then utilized to synchronize the signal generated by the transitron oscillator of said channel 16 with the angular position of the nutating beam E. The synchronized reference voltage developed by said transitron oscillator is coupled to phase comparing circuits 18, 19, 21 and 22, and combined with the signal derived in beam interception detection channel 17.

The signal derived in channel 17 is fed directly to phase comparing circuit 18 and combined with the reference voltage fed directly from the transitron oscillator. It is also fed through the 180° phase shifting network 20 to phase comparing circuit 21 and combined with the reference voltage fed directly from the transitron oscillator. The resulting output signals are directly proportional to the plane and amplitude of the combined voltages. Assuming that the signal derived in circuit 18 is indicative of the distance the missile M is vertically above the axis of the beam E, then, by reason of the 180° phase shift, the signal derived in circuit 21 is indicative of the distance the missile M is vertically below the axis of the beam E. In a similar manner, by meason of the 90° phase shift imposed on the reference voltage by a phase shifting network 23, phase comparing circuits 19 and 22 derive signals indicative of the distance the missile is horizontally to the right or to the left of said beam axis. The controlling intelligence thus derived is then coupled through cathode followers 24, 25, 26 and 27 and actuating circuits 28 and 29 to relays for actuating the control surfaces of the missile M.

Figure 4:
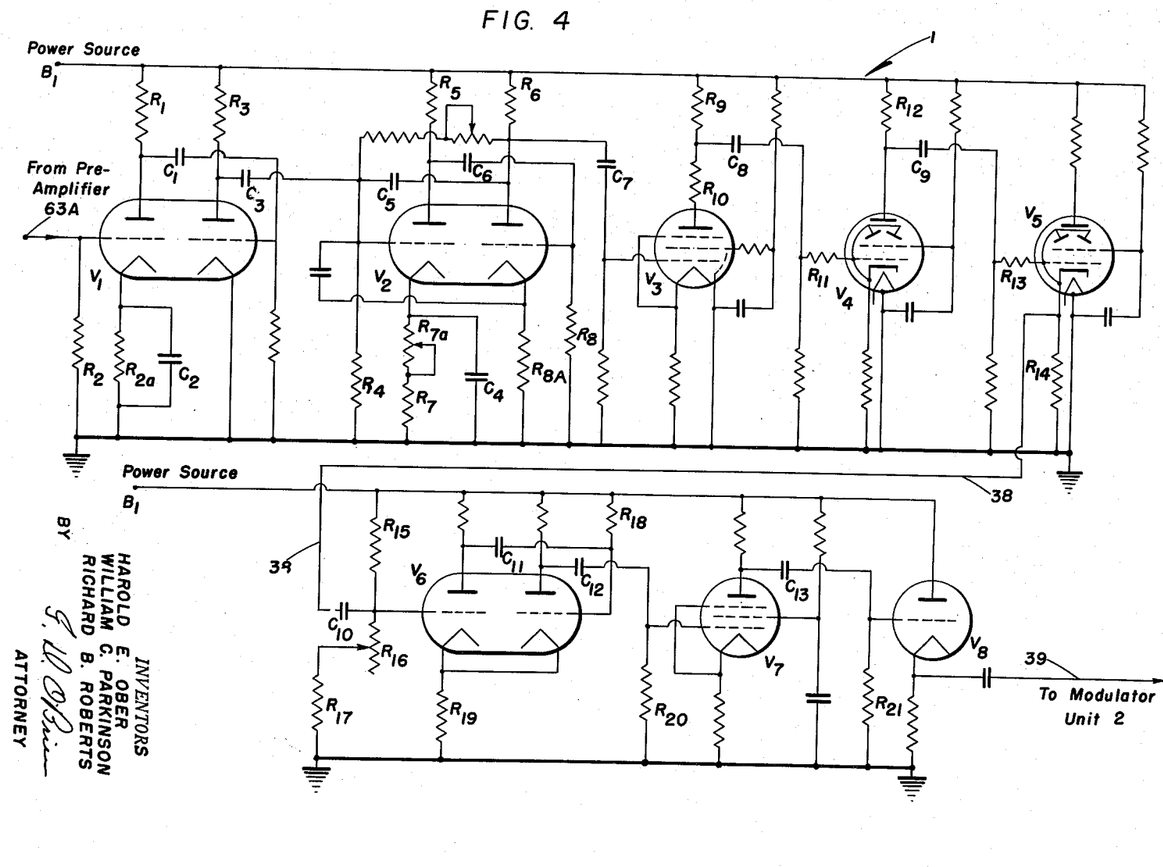
FIG. 4 is a circuit diagram of the modulation generator used in the transmitter of the system.

The transmitter unit is shown in FIGS. 2, 4, 5, 6 and 7. It should be understood that some conventional circuit elements, of obvious type and purpose, need no reference description, and such descriptive material has been omitted for the sake of brevity. As is best shown in FIG. 4, modulation generator 1 comprises a duo-triode $V_1$ having the control grid of its first section connected to the amplifier 11, as will be more fully described hereinafter. The first triode section has its plate coupled through a load resistor $R_1$ to a common source of plate potential $B_1$ and through a coupling capacitor $C_1$ to the control grid of said second triode section, and has its cathode connected through a bias circuit $R_2R_{2a}C_2$ to ground. The second triode section has its plate coupled through a load resistor $R_3$ to said common source of plate potential $B_1$ and its cathode connected to ground directly. The plate side of load resistor $R_3$ is coupled through a differentiating circuit $C_3R_4$ to a second duo-triode $V_2$. The first and second triode sections of duo-triode $V_2$ have the plates thereof connected to the common source of plate potential $B_1$ through a pair of load resistors $R_5$ and $R_6$, respectively, and have their cathodes returned to ground through a variable bias circuit $R_7R_{7a}C_4$, and a resistor $R_{8a}$ respectively. The plates and control grids of each of said triode sections of duo-triode $V_2$ are interconnected by a pair of coupling capacitors $C_5$ and $C_6$, and said control grids are biased by resistors $R_4$ and $R_8$. By this arrangement, duo-triode $V_2$ forms a standard resistance-capacitance coupled multivibrator having the period of its output signal controlled by variable bias resistor $R_{7a}$. The output of multivibrator $V_2$ is coupled through a coupling capacitor $C_7$ to a conventional two stage resistance-capacitance coupled amplifier including a pentode $V_3$, resistors $R_9$ and $R_{10}$, capacitor $C_8$, resistors $R_{11}$ and $R_{12}$ and a beam power amplifier tube $V_4$. The output of beam power amplifier tube $V_4$ is connected through a capacitor $C_9$ and a resistor $R_{13}$ to a second beam power amplifier tube $V_5$ having a load resistor $R_{14}$ connected in its cathode circuit. The cathode side of load resistor $R_{14}$ is connected through a coupling capacitor $C_{10}$ and a low impedance transmission line 38 to a wave shaping circuit comprising a third duo-triode $V_6$. The first triode section of said duo-triode $V_6$ has the transmission line 38 connected to its control grid through a voltage dividing network $R_{15}$, $R_{16}$ and $R_{17}$, and has its plate coupled through a capacitor $C_{11}$ to the control grid of the second triode section of said duo-triode $V_6$. The second triode section is rendered normally conductive by a positive bias applied to the control grid thereof through a resistor $R_{18}$. The cathodes of said duo-triode $V_6$ are conected together and to ground through a cathode resistor $R_{19}$ and the plates to source $B_1$ through appropriate load resistors. Due to the current drawn by said second triode section of $V_6$, a negative bias is developed across common cathode resistor $R_{19}$ which renders said first triode section normally nonconductive, and which is overcome by a positive voltage appearing on the control grid of said first triode section. By means of this arrangement, duo-triode $V_6$ operates as a "one shot" multivibrator. The output of this one shot multivibrator is connected through a differentiating circuit $C_{12}R_{20}$ to the control grid of a pentode amplifier tube $V_7$. Pentode amplifier tube $V_7$ has its plate coupled through a coupling capacitor $C_{13}$ to the grid of a triode $V_8$. Triode $V_8$ has a load resistor $R_{21}$ connected in its cathode circuit, and has the plate thereof connected directly to the source of plate potential $B_1$. By reason of this arrangement, triode $V_8$ operates as a cathode follower impedance matching device between the high impedance output of generator 1 and a low impedance transmission line 39. The output of this impedance matching device is connected to the input of the modulator 2, shown schematically in FIG. 5, by a suitable coupling condenser and said transmission line 39.

Figure 5:
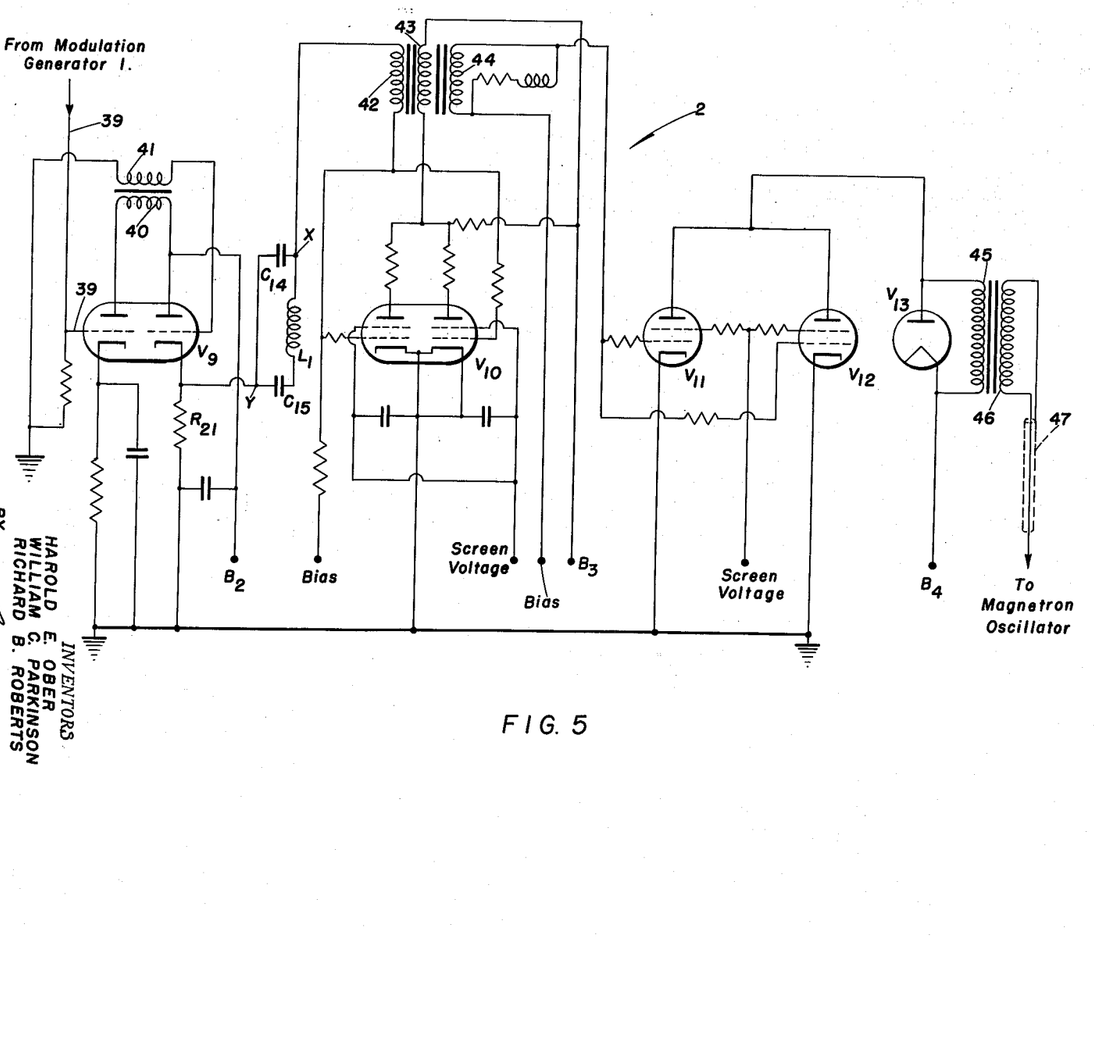
FIG. 5 is a circuit diagram of the modulator section of the transmitter.

In FIG. 5, the modulator 2 includes a duo-triode $V_9$, the plates of which are connected to the terminals of primary winding 40 of a transformer 40, 41, and to a second source of plate potential $B_2$. The output of the first triode section is coupled by said transformer 40, 41, to the control grid of the second triode section, and the output of said second triode section is taken from the cathode circuit thereof. The cathode side of resistor $R_{21}$ is connected through an artificial transmission line comprising capacitors $C_{14}$, $C_{15}$ and inductance $L_1$, and a secondary winding 42 of a split secondary transformer 42, 43, 44, to the control grids of a duo-tetrode amplifier tube $V_{10}$. Resistor $R_{21}$ has a value such that, if added in series with the cathode to grid resistance of said duo-tetrode $V_{10}$ upon said duo-tetrode $V_{10}$ drawing grid current, the sum of the two resistances will approximately equal the characteristic impedance of said artificial transmission line. The sections of said duo-tetrode amplifier tube $V_{10}$ have their plates connected in parallel, and, through primary winding 43, to a high voltage source of plate potential $B_3$. The secondary winding 44 is connected to the control grids of a pair of tetrode amplifier tubes $V_{11}$ and $V_{12}$, connected in parallel, the plates of said tubes $V_{11}$ and $V_{12}$ being connected in parallel and to one terminal of the primary winding of a pulse shaping transformer 45, 46, the other terminal of said primary winding 45 being connected to the positive terminal of a high voltage source $B_4$ (not shown). Transformer 45, 46 has one of its primary terminals connected to the anode of a shorting diode $V_{13}$, the other primary terminal being connected to one side of the filamentary cathode of diode $V_{13}$. The secondary winding of transformer 45, 46 is connected through a coaxial transmission line 47 to the magnetron oscillator unit 3, shown in FIG. 6.

The coaxial transmission line 47 is connected to the primary winding 48 of a split secondary pulse transformer 48, 49, 50, said transformer having its secondary windings 49 and 50 connected, respectively, in series with the cathode filament leads of magnetron oscillator tube $V_{14}$.

The pulsed radio frequency signal generated by magnetron oscillator $V_{14}$ is coupled through a wave guide section 51 to the TR box 4 which may be included in wave guide section 51 for the purpose of protecting the crystal detector of a receiver, if one is incorporated in the guidance system, in order to operate the transmitter unit as a part of a radar system. If such an arrangement is utilized, the position of a target T and a missile M being guided can be ascertained at any instant during its flight, from the ground station. The inclusion of such a receiver is purely optional, however, for the operation of the transmitter unit as a part of a radar system is not essential to the proper operation of the guidance system. The output of TR box 4 is coupled through a second wave guide section 52 and fed to the antenna 7, as will be described hereinafter.

Wave guide section 52 is coupled through a pair of rotary wave guide joints, indicated schematically at 5, a third section of wave guide 53 contained within the housing 6, and an antenna supporting section 54 to the antenna 7. The housing 6 is mounted on swivel elements 54a and 54b.

Wave guide section 54 is mechanically supported to cooperate with wave guide section 53 by a bushing 55 mounted on housing 6 by metallic bellows 56. Also fixed to bushing 55 is a cylindrical sleeve 57 which is cut away in order to accommodate wave guide section 53, and which has a drive shaft 58 fixed to the inner end thereof. Shaft 58 is journalled in an eccentric, self-aligning bearing 59 that is mounted in a fly wheel 60 driven by motor 9. By reason of this construction, shaft 58 causes sleeve 57 to nutate about the axis of said fly wheel 60 upon operation of the motor 9. The nutation of sleeve 57 is then imparted to wave guide section 54, thereby causing antenna 7 to nutate about the focal point of parabolic reflector 8, the bellows 56 serving to maintain the wave guide 54 in its proper position.

In addition to fly wheel 60, motor 9 drives a disc 61 of the marking generator 10, said disc being physically situated between a light source 62 and a photocell 63. Disc 61 has a series of circular holes 61a uniformly spaced about its peripheral margin, which holes are selectively aligned with said light source 62 and said photocell 63. The disc 61 is designed so that, at a particular point 62a on its periphery, hereinafter called the marking point, the series of holes 61a is interrupted by omitting one or two of them. The disc 61 is keyed to the shaft of motor 9 in such a manner that said marking point passes between the light source 62 and photocell 63 at the same instant that antenna 7 passes through an arbitrarily selected reference point on the circle of revolution described by said antenna 7 about the focal point of parabolic reflector 8 in one nutation cycle. The output of photocell 63 is connected to the control grid of a pentode $V_{15}$ of a preamplifier 63A, said tube having its plate connected through a load resistor $R_{22}$ to the source of plate potential $B_1$, and through a coupling capacitor $C_{16}$ and a transmission line 64 to the amplifier and impedance matching network 11.

Figure 7:
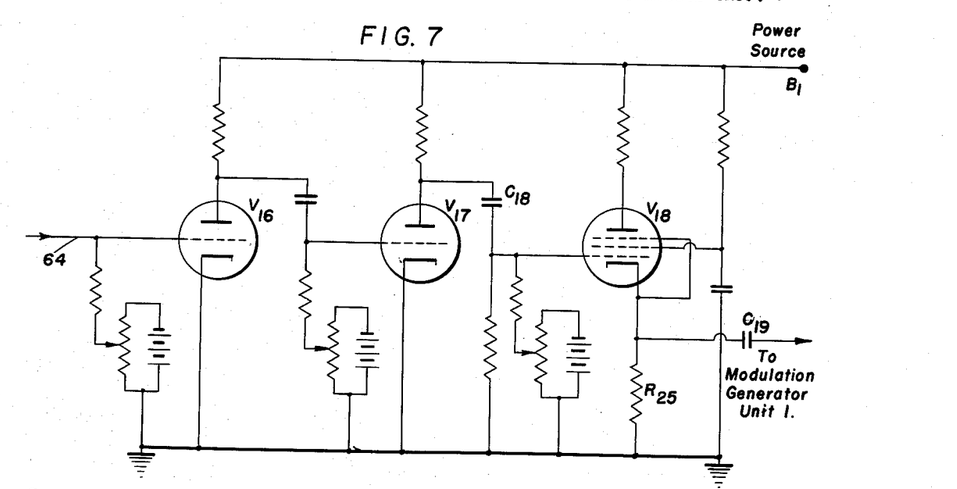
FIG. 7 is a circuit diagram of the amplifier and impedance matching network connecting the output of the marking generator with the modulation generator.
Figure 8:
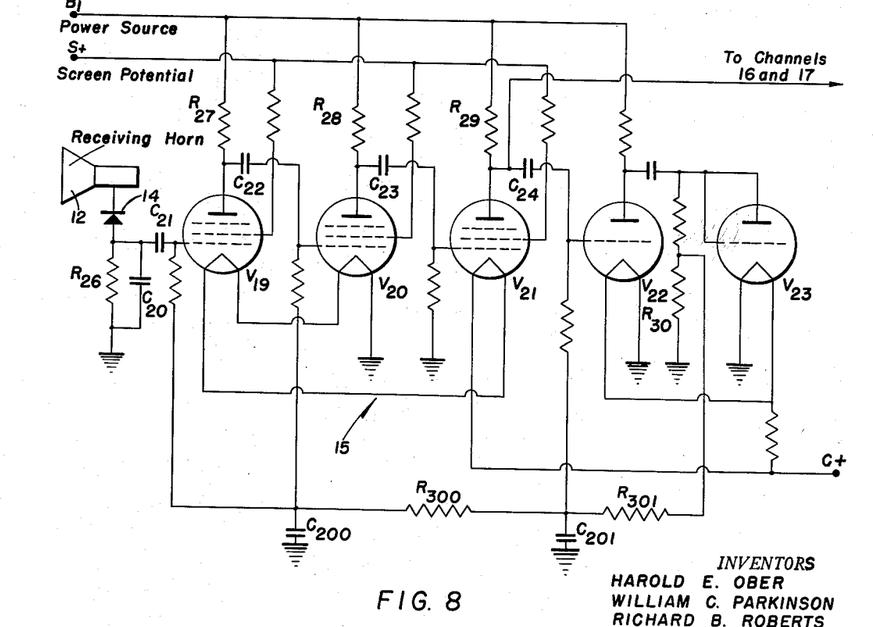
FIG. 8 is a circuit diagram of the first detector and pulse amplifier stages of the guidance system receiver.

As is best shown in FIG. 7, network 11 includes a conventional two stage resistance-capacitance coupled amplifier consisting of triodes $V_{16}$ and $V_{17}$ and the usual capacitors and resistors. The output of said two stage amplifier is coupled through a capacitor $C_{18}$ to a pentode amplifier tube $V_{18}$. Pentode $V_{18}$ has a load resistor $R_{25}$ connected in its cathode circuit, and is coupled through a capacitor $C_{19}$ to modulation generator 1. By these amplifiers, the synchronizing voltage generated by photocell 63 is coupled to modulation generator 1, illustrated in FIG. 4, and is used to synchronize the modulating signal generated by said modulation generator 1 with the nutation of dipole antenna 7.

Having described the arrangement of the transmitter unit, its operation will now be described with reference to FIG. 4, the multivibrator (tube $V_2$) is a "one shot" multivibrator and may be synchronized with a signal fed from distorting amplifier (tube $V_1$). The square wave signal generated by the multivibrator is amplified by amplifiers (tubes $V_3$ and $V_4$), and coupled through the cathode follower (tube $V_5$), transmission line 38 and coupling capacitor $C_{10}$, and applied to the wave shaping circuit which consists of duo-triode $V_6$ and differentiating circuit $C_{12}R_{20}$. This circuit is included for the dual purpose of properly shaping the square wave modulating voltage generated by the multivibrator, and for delaying the modulating voltage a predetermined length of time, should it be desired to operate the transmitter as part of a radar set. If the transmitter is operated in this fashion, synchronizing voltages for operating the indicator console of the set may be taken off transmission line 64 (FIG. 6). However, as previously stated, it is not essential to the proper operation of the guidance system that the receiver unit be included as part of a radar set. Duo-triode $V_6$ (FIG. 4), which operates as a "one shot" multivibrator, has its second triode section normally conducting and its first triode section normally non-conductive. Upon the appearance of a positive voltage on the control grid of said first triode section, a change in this condition is initiated, and this results in the application of a sharp positive pulse to differentiating circuit $C_{12}R_{20}$. The extremely sharp "pip" produced by differentiating circuit $C_{12}R_{20}$ is amplified by amplifier tube $V_7$ and coupled through cathode follower tube $V_8$ and transmission line 39 to modulator 2.

As best seen in FIG. 5, the sharp voltage "pip" fed to modulator 2 over transmission line 39 is applied to the first triode section of duo-triode $V_9$ in which it is amplified and coupled through transformer 40, 41 to the control grid of the second triode section. The second triode section of tube $V_9$ operates as a cathode follower and serves to couple the amplified voltage "pip" to the pulse forming circuit comprising artificial transmission line $C_{14}$, $C_{15}$, and $L_1$ and regeneratively coupled duo-tetrode $V_{10}$ which is operated as a normally non-conducting, line controlled, blocking grid oscillator. Upon the appearance of a positive "pip" in the output of the cathode follower section of tube $V_9$, both tetrode sections of $V_{10}$ start conducing through the primary winding 43 of split secondary transformer 42, 43, 44. Due to the inductance of winding 43, this current builds up exponentially, and, like all exponential curves, is very nearly a straight line at the beginning. There is, therefore, a constant increase through the primary for a short period of time, which produces a constant voltage in the secondary windings 42 and 44. The voltage induced in secondary winding 42 is of such polarity that the control grids of duo-tetrode $V_{10}$ are maintained positive, and said tube continues to conduct. Due to said control grids being driven positive, grid current will be drawn by said duo-tetrode $V_{10}$, and will result in the production of a low impedance path in the grid to cathode circuits of said duo-tetrode. Secondary winding 42 "sees" the low impedance path thus produced in series with the cathode resistor $R_{21}$ and the artificial transmission line, and, because the sum of resistor $R_{21}$ and said grid to cathode impedance is approximately equal to the characteristic impedance of the transmission line, the voltage appearing across winding 42 will divide between said artificial line and the two resistances. The portion of this voltage applied to terminals X, Y of said artificial transmission line travels to the end of the line, where it is reflected without change in phase, and returns to said terminals to add to the voltage being fed in across resistor $R_{21}$. The summation of the two voltages produces a third voltage approximately equal to the transformer voltage and 180° out of phase therewith, which allows the control grids of duo-tetrode $V_{10}$ to be driven below cut-off by the grid bias supply. Duo-tetrode $V_{10}$ then ceases to conduct. The result of the whole process described is a sharp rising voltage, a period of constant voltage, and a sharp decrease in voltage, which appears across secondary winding 44 as a square, high voltage pulse, that is fed in parallel to the control grids of tetrodes $V_{11}$ and $V_{12}$. The high voltage pulse applied to the control grids of tetrodes $V_{11}$ and $V_{12}$ drives the plates thereof negative, and results in the appearance of a large negative pulse that is applied across the primary winding of pulse transformer 45, 46. In order to prevent distortion of the pulse induced in secondary winding 46 due to swing back in the positive direction, shorting diode $V_{13}$ conducts upon the pulse swinging positive and short circuit primary winding 45. The negative pulse appearing across the secondary winding 46 is then coupled through coaxial cable 47 to magnetron oscillator 3.

With further reference to FIG. 6, the triggering pulse derived in modulator 2 and coupled through coaxial transmission line 47, is applied across the primary winding 48 of split secondary transformer 48, 49, 50. This triggering pulse causes tube $V_{14}$ to generate radio frequency signals intermittently at a repetition rate equal to the frequency of the square wave voltage generated by multivibrator $V_2$. This pulsed radio frequency signal is coupled to the antenna 7 through wave guide sections 51, 52, 53, 54, TR box 4, and train and elevation wave guide joints 5. Antenna 7 consists of a single dipole radiating element and a half wave reflector which prevents direct forward radiation from the radiating element and concentrates the energy emitted from said radiating element back into parabolic reflector 8. Because said dipole radiating element is physically situated at approximately the focal point of the parabolic reflector 8, the emitted energy is reflected back in a beam E in the forward direction. As pointed out hereinbefore, due to the nutation imparted to antenna 7 by motor 9, the reflected beam E of energy will be nutated about an axis passing through the focal point and vertex of reflector 8, and will describe a cone of revolution in space during each nutation cycle.

By establishing a reference plane on the cone of revolution thus described, information pertaining to the relative position of a missile M situated within the cone, with respect to said nutation axis and said reference plane, can be derived by a suitable means mounted within the missile. The information can then be used by said means to retain the missile M on or close to the axis of nutation. As previously explained, marking generator 10 constitutes a means for establishing this reference plane and includes the disc 61 which is situated between the light source 62 and the photocell 63. Light passing from the source 62 will give rise to the generation of a square wave voltage by said photocell. This voltage, hereinafter called the synchronizing voltage, will have a frequency equal to the product of the speed of the motor 9 and the number of holes 61a in disc 61, and will have an interruption occurring therein at the instant that the marking point 62a on said disc 61 passes between said light source 62 and said photocell 63. Because disc 61 and antenna 7 are rotated in synchronism, this interruption, hereinafter called the missing pulse, can be used to indicate the instantaneous position of antenna 7 and, therefore, of the nutating beam E. As best seen in FIGS. 6 and 7, the synchronizing voltage modulated by said missing pulse is amplified by amplifier $V_{15}$ and coupled over transmission line 64, the two stage amplifier which includes the tubes $V_{16}$, $V_{17}$, and the cathode follower utilizing tube $V_{18}$ to modulation generator 1. Referring again to FIG. 4, the synchronizing signal fed to modulation generator 1 is applied to the first triode section of amplifier tube $V_1$. The control grid of said triode section is biased negatively by RC circuit $R_2R_{2a}C_2$ so that said section is non-conductive during the negative one-half cycle of said synchronizing voltage. The negative pulses appearing at the plate terminal thereof are coupled to the control grid of the second triode section, in which they are amplified and appear as positive pulses at the plate terminal of the said second section. These positive pulses are differentiated by differentiating circuit $C_3R_4$ and appear as sharp negative "pips" on the control grid of multivibrator tube $V_2$. As previously stated, tube $V_2$ constitutes a part of a "one shot" multivibrator having a frequency approximately equal to the product of the speed of motor 9 multiplied by the number of holes 61a in disc 61, said multivibrator being timed so that the first triode section of said tube $V_2$ is conducting and the second triode section thereof is non-conductive for about two thirds of the normal multivibrator cycle, that is, at the instant that the synchronizing "pip" is applied to the control grid of said first triode section of tube $V_2$, said section is conducting and the negative "pip" produces a rise in plate potential therein. This rise in plate potential is coupled through capacitor $C_6$ to the control grid of said second triode section of tube $V_2$ and renders that section conductive. The resulting drop in plate potential of said second triode section is coupled through capacitor $C_5$ to drive the control grid of said first section of tube $V_2$ more negative and eventually to cut-off. Upon the first triode section of tube $V_2$ being rendered non-conductive, the negative bias developed across the cathode resistor $R_7$ decreases to zero, and the first section is again rendered conductive. The cycle is then repeated. Upon the occurrence of the missing pulse, no negative synchronizing "pip" appears on the control grid of the first triode section of multivibrator tube $V_2$ to initiate a change in the multivibrator condition. As a consequence, one cycle of the output signal is, therefore, missed. By this means, the missing pulse is superimposed on the pulse modulated radio frequency signal transmitted to the missile M to be guided, and serves to establish the previously mentioned reference plane in the cone of revolution described by the nutating beam E radiated from antenna 7.

With reference now to FIGS. 3, 8, 9 and 10, the receiver unit R (FIG. 2) of the guidance system comprises electromagnetic energy receiving horn 12 coupled to the crystal detector 14 having load circuit comprising resistor $R_{26}$ and capacitor $C_{20}$. Horn 12 is coupled, by a capacitor $C_{21}$ and said load circuit, to the three stage pulse amplifier 15 including pentodes $V_{19}$, $V_{20}$ and $V_{21}$. Pentode $V_{19}$ has its input grid connected to said capacitor $C_{21}$ and its plate connected through a load resistor $R_{27}$ to a common source of positive plate potential $B_1$. The screen grid of pentode $V_{19}$ is connected through a dropping resistor to a common source of screen potential $S^+$. The plate of pentode $V_{19}$ is also coupled, through a capacitor $C_{22}$, to a second pentode $V_{20}$ having a load resistor $R_{28}$ connected between its plate and source $B_1$. The plate of tube $V_{20}$ is coupled through a capacitor $C_{23}$ to the control grid of a third pentode $V_{21}$ having a plate load resistor $R_{29}$ connected to source $B_1$. Load resistor $R_{29}$ and the plate of tube $V_{21}$ are also coupled, through a capacitor $C_{24}$, to an automatic volume control circuit which includes triodes $V_{22}$ and $V_{23}$. Triode $V_{23}$ is connected as a diode rectifier. A center-tapped load resistor $R_{30}$ is connected between the plate of the tubes $V_{22}$ and $V_{23}$ and ground, and the center tap of said resistor $R_{30}$ is connected to the control grids of tubes $V_{19}$ and $V_{20}$ through a filter which comprises resistors $R_{300}$ and $R_{301}$ and capacitors $C_{200}$ and $C_{201}$.

The output of the three stage amplifier 15 is coupled to synchronizing channel 16, (FIG. 9) and beam interception detection channel 17 through a pair of coupling capacitors $C_{25}$ and $C_{26}$. Synchronizing channel 16 comprises a duo-triode $V_{24}$ having its sections coupled through a capacitor $C_{27}$, and having its circuit parameters properly proportioned to operate as a two stage limiter. The plate of said first triode section of tube $V_{24}$ is connected to a second source of positive plate potential $B_2$ through a load resistor $R_{31}$, and the plate of said second triode section is also coupled to said source of positive plate potential $B_2$ through a load resistor $R_{32}$. The plate of said second triode section is also coupled, through a capacitor $C_{28}$, to the control grid circuit of a thyratron $V_{25}$. Thyratron $V_{25}$ has its plate connected through a resistor $R_{33}$ to said source of plate potential $B_2$, and has its control grid biased below cut-off by a negative potential applied through a resistor $R_{34}$. Quenching of the thyratron is effected by capacitor $C_{202}$. The plate of thyratron $V_{25}$ is coupled through a capacitor $C_{30}$ to a pentode $V_{26}$, which operates as an RC transitron oscillator at a frequency determined by the values of a parallel RC circuit $R_{35}$ and $C_{31}$, connected in the screen grid circuit of said pentode $V_{26}$, and a capacitor $C_{32}$ and resistor $R_{36}$ connected to the suppressor grid thereof. Transitron oscillator $V_{26}$ is tuned to the nutation frequency of the nutating beam E and has its output coupled to the phase comparing circuits, to be described hereinafter, in which the reference voltage generated by said oscillator is combined with the signal derived in beam interception detection channel 17.

Figure 9:
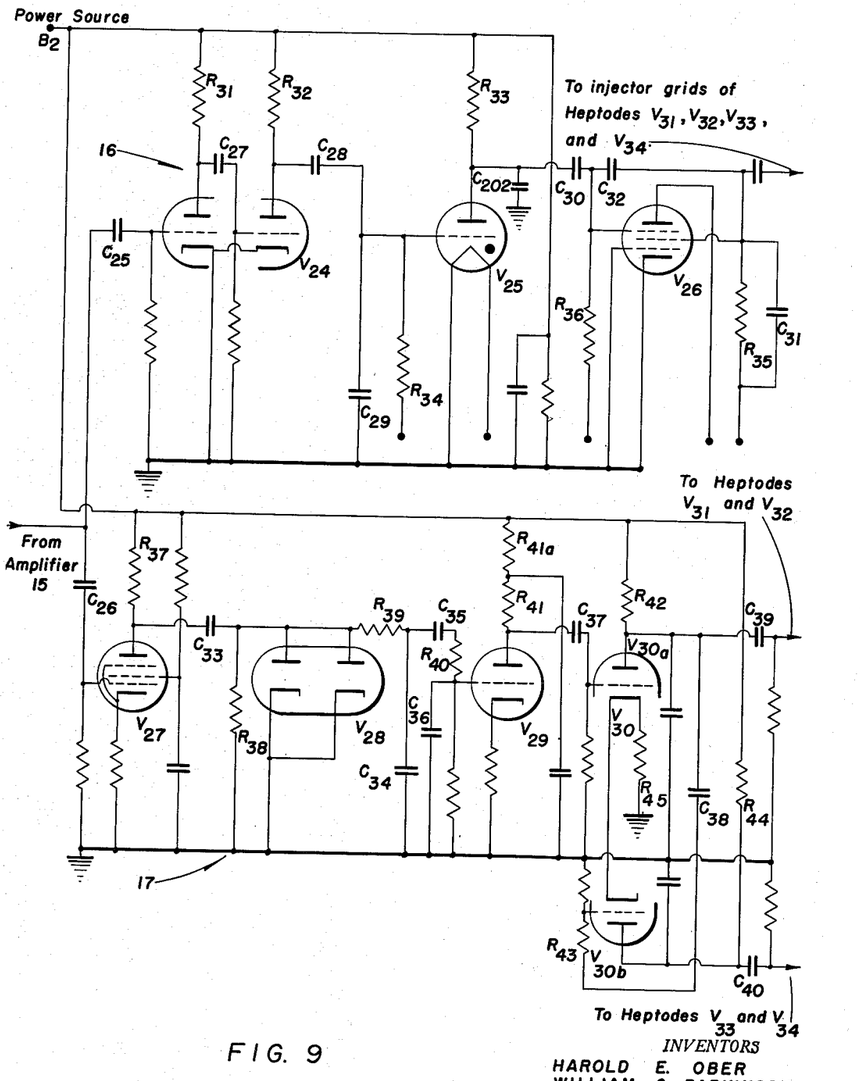
FIG. 9 is a circuit diagram of the synchronizing and beam interception detection channels of the receiver.

Beam interception detection channel 17 comprises a one stage amplifier having pentode $V_{27}$ with its plate connected through a plate load resistor $R_{37}$ to said source of plate potential $B_2$. The plate of pentode $V_{27}$ is coupled through a capacitor $C_{33}$ to the plates of a duo-diode detector tube $V_{28}$, a load resistor $R_{38}$ being connected between said plates and ground. The values of capacitor $C_{33}$ and load resistor $R_{38}$ are such that the RC time constant of said resistor and capacitor is substantially equal to the period of a nutation cycle of the nutating beam E. Thus a signal having a frequency equal to the nutation frequency of the nutating beam E will be derived from across resistor $R_{38}$ by detector tube $V_{28}$. Resistor $R_{38}$ is coupled to an amplifier triode $V_{29}$ through a filter network, tuned to pass said nutation frequency and comprising resistor $R_{39}$, capacitors $C_{34}$, $C_{35}$, resistor $R_{40}$, and capacitor $C_{36}$. The plate of amplifier triode $V_{29}$ is coupled through load resistors $R_{41}$ and $R_{41a}$ to source of plate potential $B_2$, and by a coupling capacitor $C_{37}$ to the control grid of the first triode section $V_{30a}$ of a duo-triode $V_{30}$. Triode section $V_{30a}$ has its plate connected through a load resistor $R_{42}$ to said source of plate potential $B_2$, and through a coupling capacitor $C_{38}$ and an attenuating resistor $R_{43}$ to the control grid of the second triode section $V_{30b}$. Triode section $V_{30b}$ has its plate connected to said source of plate potential $B_2$ through a load resistor $R_{44}$, and has its cathode connected to ground, in common with the cathode of triode section $V_{30a}$, through a bias resistor $R_{45}$.

Figure 10:
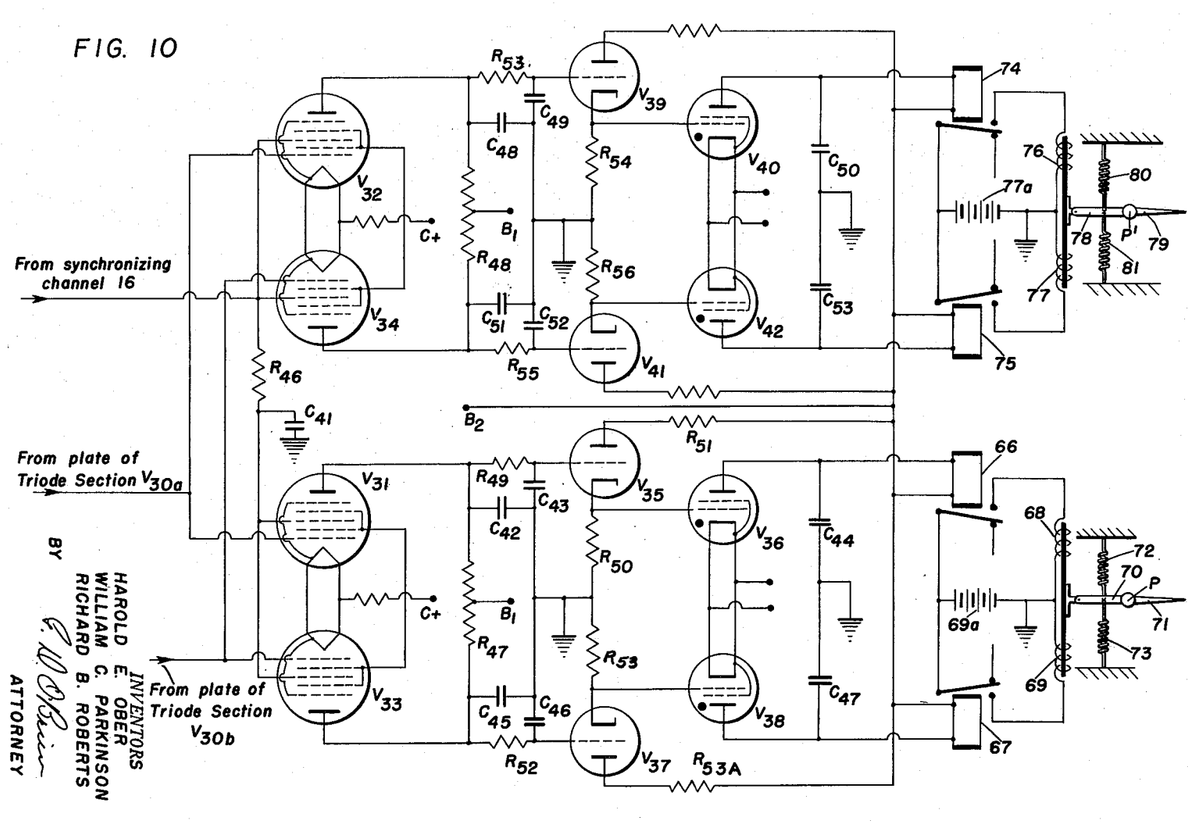
FIG. 10 is a circuit diagram of the phase comparing and output control sections of the receiver.

Referring now to FIG. 10 in conjunction with FIG. 9, the plate of triode section $V_{30a}$ is coupled through a coupling capacitor $C_{39}$ (FIG. 9) to the control grids of a pair of phase comparing heptodes $V_{31}$ and $V_{32}$, said grids being connected in parallel. Triode section $V_{30b}$ (FIG. 9) has its plate connected through a coupling capacitor $C_{40}$ to the control grids, connected in parallel, of a second pair of phase comparing heptodes $V_{33}$ and $V_{34}$. Thus, because of the 180° phase shift imposed by amplifier $V_{30b}$, the signal applied to phase comparing heptodes $V_{33}$ and $V_{34}$ is 180° out of phase with the signal applied to heptodes $V_{31}$ and $V_{32}$. Phase combining heptodes $V_{31}$, $V_{32}$, $V_{33}$ and $V_{34}$ combine the reference voltage generated by synchronizing channel 16 with the error signal developed by beam interception detection channel 17, and derive a signal in the output thereof that is indicative of the amount that the missile M is off the nutation axis of the nutating beam E. To achieve this, and as previously explained, the control grids of heptodes $V_{31}$ and $V_{32}$ are connected in parallel and to the output of amplifier tube $V_{30a}$, and the control grids of heptodes $V_{33}$ and $V_{34}$ are connected in parallel and to the output of amplifier tube $V_{30b}$. The injector grids of heptodes $V_{31}$, $V_{32}$, $V_{33}$ and $V_{34}$ are connected in parallel and to the output of transitron oscillator tube $V_{26}$, and the injector grids of $V_{32}$ and $V_{34}$ are connected in parallel and through a 90° phase shifting network comprising a resistor $R_{46}$ and a capacitor $C_{41}$ to the output of said transitron oscillator. All of said heptodes $V_{31}$, $V_{32}$, $V_{33}$, and $V_{34}$ have their control grids biased slightly above cut off, and the injector grids thereof biased well beyond cut off. Heptodes $V_{31}$ and $V_{33}$ have the cathodes thereof connected in common to a source of very low positive potential $C^+$, and the plates thereof inter-connected through a common load resistor $R_{47}$ that is coupled to the previously mentioned source of plate potential $B_1$ by a center tap lead. Heptodes $V_{32}$ and $V_{34}$ have their cathodes connected in parallel and to said source of positive low potential $C^+$. The plates of tubes $V_{32}$ and $V_{34}$ are interconnected through a common load resistor $R_{48}$ that is coupled to said source of plate potential $B_1$ by a center tap lead. By this arrangement, each of said four heptodes $V_{31}$, $V_{32}$, $V_{33}$, and $V_{34}$ produces a D.C. output voltage that is proportional to the phase difference between the reference voltage developed in said synchronizing channel 16 and the error signal derived in said beam interception detection channel 17. This D.C. voltage periodically varies in magnitude, by an amount that is dependent upon the deviation of the missile M from its ideal course, and at frequency dependent upon the rate of change in position of the missile M.

The slowly varying D.C. voltage derived by each of the heptodes $V_{31}$, $V_{32}$, $V_{33}$, and $V_{34}$ is then used to actuate the control surfaces of the missile M. For this purpose, heptode $V_{31}$ has its plate coupled through a low pass filter comprising capacitors $C_{42}$, $C_{43}$ and resistor $R_{49}$ to the control grid of a cathode follower triode $V_{35}$. Triode $V_{35}$ has a cathode load resistor $R_{50}$ with its cathode side connected to the control grid of a thyratron $V_{36}$, said tube $V_{35}$ having its plate connected through a voltage dropping resistor $R_{51}$ to the previously mentioned source of plate potential $B_2$. Thyratron $V_{36}$ comprises a part of an electrical series circuit including a control relay 66 and said source of plate potential $B_2$, a quenching capacitor $C_{44}$ being connected between the plate of tube $V_{36}$ and ground. Heptode $V_{33}$ is coupled through a low pass filter comprising capacitors $C_{45}$, $C_{46}$ and resistor $R_{52}$ to the control grid of cathode follower triode $V_{37}$. Tube $V_{37}$ has a load resistor $R_{53}$ in its cathode circuit, the cathode side of which said resistor is connected to the control grid of a thyratron $V_{38}$, the plate of said tube $V_{37}$ being connected to said source of plate potential $B_2$ through a voltage dropping resistor $R_{53A}$. Thyratron $V_{38}$ has its plate connected through the coil of a control relay 67 to said source of plate potential $B_2$, and to one terminal of a quenching capacitor $C_{47}$ the other terminal of said capacitor $C_{47}$ being grounded. Control relays 66 and 67 have their switching contacts connected in series with the coil windings of a pair of electromagnets 68 and 69, respectively; and the series circuits thus comprised are connected in parallel through a common battery 69a and ground. The armatures of said electromagnets are physically opposed, and are mechanically linked to an arm 70 that actuates a missile controlling surface, indicated diagrammatically at 71. The arm 70 is pivoted at point P and is maintained in its physically neutral position by a pair of bias springs 72 and 73.

Heptode $V_{32}$ has its plate coupled through a low pass filter comprising capacitors $C_{48}$, $C_{49}$ and resistor $R_{53}$ to the control grid of a cathode follower triode $V_{39}$. Triode $V_{39}$ has a load resistor $R_{54}$ connected in its cathode circuit, the cathode side of said resistor $R_{54}$ and said cathode being connected to the control grid of a thyratron $V_{40}$. Thyratron $V_{40}$ is included in a series electrical circuit consisting of a control relay 74 and said source of plate potential $B_2$, and has a quenching capacitor $C_{50}$ connected between its plate and ground. Heptode $V_{34}$ is coupled through a filter circuit $C_{51}$, $C_{52}$ and $R_{55}$ to a cathode follower triode $V_{41}$. Tube $V_{41}$ has a load resistor $R_{56}$ included in its cathode circuit and its cathode connected to the control grid of a thyratron $V_{42}$. Thyratron $V_{42}$ has its plate connected to said source of plate potential $B_2$ through a control relay 75, and to one terminal of a quenching capacitor $C_{53}$, the other terminal of said capacitor being connected to ground. Control relays 74 and 75 have their switching contacts connected in series with the coil windings of a pair of electromagnets 76 and 77, respectively; and the series circuits thus constituted are connected in parallel through a common battery 77a and ground. The armatures of said electromagnets 76 and 77, like the armatures of electromagnets 68 and 69 are mechanically linked to an arm, shown at 78, which actuates a controlling surface 79, and which is pivoted at point P'. The arm is maintained in a neutral position by a pair of bias springs 80 and 81, similar to springs 72 and 73, and is controlled in its action by said armatures.

Having described the construction of the receiver unit, its operation will now be described. Upon the missile M becoming displaced from the nutation axis of the nutating beam E, the amplitude of the received energy will vary from a maximum at the instant that the maximum lobe of the beam E is pointing at the missile M, to a minimum at the instant that the beam E has nutated 180° away from the missile M, as previously pointed out. The superimposed amplitude modulation will have an amplitude dependent upon the distance that the missile M is off the axis of the beam E, and a phase dependent upon the position of the missile M relative to the reference plane established by the submodulation missing pulse. Upon detection, the received energy results in an amplitude modulated, pulse frequency signal submodulated by said missing pulse, which is coupled to three stage pulse amplifier 15. Because the average amplitude of the received pulses depends upon the distance of the missile M from the transmitter, the automatic gain control action of triode $V_{23}$ is incorporated to keep the average amplitude of the detected pulses constant, and thereby render the derived error voltage independent of the missile range. From the output of three stage amplifier 15, the detected pulses are fed in parallel to synchronizing channel 16 and beam interception detection channel 17.

The portion of the signal fed to synchronizing channel 16 has both the negative and positive half cycles thereof limited by the two stage limiter which includes tube $V_{24}$. Upon the occurrence of the missing pulse in the limited signal, the plate potential of the second triode section of tube $V_{24}$ remains positive long enough to allow capacitor $C_{29}$ to charge to a value sufficiently positive to fire thyratron $V_{25}$. Upon thyratron $V_{25}$ being fired, the negative pulse appearing on its plate is coupled through capacitor $C_{30}$ to free running RC transitron oscillator $V_{26}$ and synchronizes the reference signal generated by said RC transitron oscillator $V_{26}$ with the nutation of the nutating beam E. As is best seen in FIG. 10, the synchronized reference signal is then coupled to the injector grids of each of phase comparing heptodes $V_{31}$, $V_{33}$, and through 90° phase shifting network $R_{46}$, and $C_{41}$ to the injector grids of each of phase comparing heptodes $V_{32}$ and $V_{34}$.

The portion of the pulse frequency signal applied to beam interception channel 17 is amplified by pulse frequency amplifier including tube $V_{27}$ and coupled to detector tube $V_{28}$ through capacitor $C_{33}$. The RC circuit consisting of capacitor $C_{33}$ and load resistor $R_{38}$ has a time constant substantially equal to the period of one nutation cycle of the nutating beam E; thus the detector including tube $V_{28}$ will demodulate the previously mentioned nutation frequency amplitude modulation impressed on the receiver wave. The detected amplitude modulation, that is the error signal, is applied through filter network $R_{39}$, $C_{35}$, $C_{36}$ and $R_{40}$, tuned to said nutation frequency, and amplified by amplifiers including tubes $V_{29}$ and $V_{30a}$. The error signal appearing in the plate of triode $V_{30a}$ is coupled through capacitor $C_{38}$ and attenuating resistor $R_{43}$ to the control grid of the second triode section $V_{30b}$ and, as is best shown in FIG. 10, is also coupled in parallel to the control electrodes of phase comparing heptodes $V_{31}$ and $V_{32}$. Again referring to FIG. 9, the portion of the error signal appearing on plate of triode section $V_{30b}$ is coupled to the control grids of phase comparing heptodes $V_{33}$ and $V_{34}$. Because of the 180° phase shift imposed by triode $V_{30b}$, and the attenuation of the error signal by resistor $R_{43}$, the error signal applied to the control grids of heptodes $V_{33}$ and $V_{34}$ is 180° out of phase with, and equal in amplitude to, the error signal applied to those heptodes $V_{31}$ and $V_{32}$.

As stated hereinbefore, the control grids of each of heptodes $V_{31}$, $V_{32}$, $V_{33}$ and $V_{34}$ are biased slightly above cut off, and the injector grids of each of said heptodes are biased well beyond cut off. Thus, if there is no signal derived in beam interception detection channel 17, the reference voltage applied to the injector grid of each of the heptodes in synchronizing channel 16 causes a small amount of plate current to flow during positive half cycles. Upon a signal being derived in said beam interception detection channel 17, and being applied to the heptodes $V_{31}$, $V_{32}$, $V_{33}$, and $V_{34}$, each of the heptodes draws a plate current that is roughly proportional to the product of the voltages applied to its control and injector grids. Assuming that heptode $V_{31}$ derives a control voltage that is indicative of the amount that the missile M is vertically above the nutation axis of the beam E, then, by reason of the 180° phase shift imposed by amplifier $V_{30b}$, heptode $V_{33}$ derives a control voltage indicative of the amount that the missile M is vertically below said nutation axis. Because of the 90° phase shift imposed by network $R_{46}$, $C_{41}$, heptodes $V_{32}$ and $V_{34}$ derive a control voltage indicative of the amount that the missile is horizontally to the right or to the left of said beam nutation axis.

The control voltage derived by heptode $V_{31}$ is coupled through low pass filter $C_{42}$, $R_{49}$, and $C_{43}$, and cathode follower $V_{35}$ to thyratron $V_{36}$. The output of heptode $V_{33}$ is coupled through low pass filter $C_{45}$, $R_{52}$, $C_{46}$, and cathode follower $V_{37}$ to thyratron $V_{38}$. Each of thyratrons $V_{36}$ and $V_{38}$ are biased to conduct at a particular threshold value, and upon the control voltage applied to the control grid thereof reaching this threshold value, either one or the other of said thyratrons $V_{36}$ or $V_{38}$ will conduct. Assuming that at a particular instant thyratron $V_{36}$ is conducting, then plate current flows through control relay 66 closing the switching contacts thereof, and completing the series electrical circuit through electromagnet 68. This causes the armature of said electromagnet 68 to operate control surface 71 in a direction to bring the missile back to the nutation axis of said nutating beam from a position vertically above said axis. Simultaneously with this operation, quenching capacitor $C_{44}$ is discharged to a value sufficient to quench thyratron $V_{36}$, and, upon the cessation of current flow through said thyratron $V_{36}$, recharges to a value sufficiently positive to allow said thyratron to again conduct, provided the applied control voltage is still above the threshold value. The frequency at which the quenching and firing of thyratron $V_{36}$ is accomplished is considerably higher than the time response of the switching contacts of relay 66 to a change in current flow through the relay; thus the electrical circuit through said electromagnet 68 is maintained during the sampling period until such time that said control voltage falls below the threshold value. In the event that the control voltage has dropped below the threshold value, thyratron $V_{36}$ remains non-conductive, relay 66 opens, the armature of electromagnet 68 is released, and control surface 71 is returned to its neutral position by the action of bias springs 72 and 73 on arm 70. Should thyratron $V_{38}$ be rendered conductive, instead of thyratron $V_{36}$, control relay 67 and electromagnet 69 are energized in a similar manner, and control surface 71 is actuated in the reverse direction to bring the missile back to the axis of said nutating beam from a position vertically below said axis.

The control voltage derived by heptodes $V_{32}$ and $V_{34}$ are coupled through low pass filters $C_{48}$, $R_{53}$, $C_{49}$, and $C_{51}$, $R_{55}$ and $C_{52}$, respectively, and cathode followers $V_{39}$ and $V_{41}$ to thyratrons $V_{40}$ and $V_{42}$, respectively. Each of said thyratrons are operated in same manner as thyratrons $V_{36}$ and $V_{38}$, to actuate control relays 74 and 75, which, in turn, energize electromagnets 76 and 77, respectively. Upon either of electromagnets 76 or 77 being energized, control surface 79 is actuated in a direction to bring the missile M back to the axis of said nutating beam E from a position horizontally to the right or left of said axis.

Obviously many modifications and variations of the present invention are possible in the light of the above teachings. It is, therefore, to be understood that within the scope of the appended claims, the invention may be practiced otherwise than as specifically described.

What is claimed is:

1. A control guidance system for an airborne vehicle, comprising, means for establishing a nutating beam describing a cone of revolution of electromagnetic energy in space, said beam having vehicle control intelligence modulated thereon, and receiving means mounted in said vehicle for automatically detecting and utilizing said controlling intelligence to maneuver said vehicle within said beam of electromagnetic energy.

2. The combination set forth in claim 1, and further comprising, means for moving said nutating beam of electromagnetic energy in elevation and traverse when directing upon a target.

3. A control guidance system for an airborne vehicle, comprising, means for establishing a nutating beam describing a cone of revolution of electromagnetic energy in space, said beam establishing means being located independently of said vehicle, means for modulating said beam of energy with controlling intelligence, and means mounted in said airborne vehicle for deriving said controlling intelligence from said beam.

4. The combination set forth in claim 3, and further comprising, means for moving said nutating beam of electromagnetic energy in elevation and traverse when directing upon a target, and means mounted in said missile for utilizing said controlling intelligence to retain said vehicle within said beam.

5. A control guidance system for an airborne guided missile, comprising, means for establishing a nutating beam describing a cone of revolution of electromagnetic energy in space, said beam establishing means being located independently of said missile, said beam having missile control intelligence modulated thereon, means for establishing a reference plane in said cone of revolution described by said nutating beam in a nutation cycle, means mounted in said missile for deriving a control voltage that is indicative of the position of said missile with respect to said reference plane and the axis of nutation, and means for utilizing said control voltage to actuate the controlling surfaces of said missile to thereby retain said missile on the axis of nutation.

6. The combination set forth in claim 3, further comprising, means for moving said beam of electromagnetic energy in elevation and traverse when directing upon a target, and means mounted in said missile for utilizing said control voltage to retain said missile on the nutation axis of said beam.

7. A control guidance system for an airborne guided missile, comprising, means for establishing a nutating beam describing a cone of electromagnetic energy in space, said beam establishing means being located independently of said missile, said beam having missile control intelligence modulated thereon, means for establishing a reference plane in the cone of revolution described by said nutating beam in a nutation cycle, a receiver mounted in said missile for receiving and detecting said control intelligence modulated on said beam, electronic circuits connected to said receiver for developing a reference voltage that is synchronized with the nutation of said beam, reference plane establishing circuits, means for detecting the varying amplitude signal impressed on the received energy by reason of the nutation of said beam, electronic circuits for combining said reference voltage and said detected varying amplitude signal, and circuits for deriving a resultant control voltage indicative of the sense and amount that said missile is off the nutation axis of said beam.

8. The combination set forth in claim 7, further comprising, means for moving said beam of electromagnetic energy in elevation and traverse when directing upon a target.

9. The combination set forth in claim 7, further comprising, means for moving said beam of electromagnetic energy in elevation and traverse when directing upon a target, and means mounted in said missile for utilizing said control voltage to control said missile.

10. A control guidance system for an airborne guided missile, comprising, means for establishing a nutating beam of electromagnetic energy in space, means for modulating said beam of electromagnetic energy with a submodulation receiver synchronizing signal, a receiver mounted in said missile for receiving and detecting said submodulation beam of electromagnetic energy, means connected to said receiver for developing a reference voltage that is synchronized with the nutation of said beam and submodulation receiver synchronizing signal, means for detecting the varying amplitude received signal impressed on the received energy by reason of the nutation of said beam, and means for combining said reference voltage and said detected varying amplitude signal, and for deriving a resultant control voltage indicative of the sense and amount that said missile is off the nutation axis of said beam.

11. The combination set forth in claim 10, further comprising, means for moving said beam of electromagnetic energy in elevation and traverse when directing upon a target.

12. The combination set forth in claim 10, further comprising, means for moving said beam of electromagnetic energy in elevation and traverse when directing upon a target, and means mounted in said missile for utilizing said control voltage to control said missile.

13. A control guidance system for an airborne guided missile, comprising, means for establishing a nutating beam of electromagnetic energy in space, means for modulating said beam of electromagnetic energy with a submodulation receiver synchronizing signal, means for synchronizing said modulating means with the nutation of said nutating beam, a receiver mounted in said missile for receiving and detecting said submodulated beam of electromagnetic energy, means connected to said receiver for developing a reference voltage that is synchronized with the nutation of said beam and submodulation receiver synchronizing signal, means for detecting the varying amplitude received signal impressed on the received energy by reason of the nutation of said beam, and means for combining said reference voltage and said detected varying amplitude signal, and for deriving a resultant control voltage indicative of the sense and amount that said missile is off the nutation axis of said beam.

14. The combination set forth in claim 13, further comprising, means for moving said beam of electromagnetic energy in elevation and traverse when directing upon a target.

15. The combination set forth in claim 13, further comprising, means for moving said beam of electromagnetic energy in elevation and traverse when directing upon a target, and means mounted in said missile for utilizing said control voltage to control said missile.

16. A control guidance system for an airborne guided missile, comprising, means for establishing a nutating beam describing a cone of revolution of electromagnetic energy in space, means for modulating said beam of electromagnetic energy with a submodulation receiver synchronizing signal for establishing a reference position on the cone of revolution described by said nutating beam, means for synchronizing said modulating means with the nutation of said nutating beam; and means mounted in said missile and comprising an antenna, a detector coupled to said antenna, a synchronizing channel connected to said detector output and comprising a source of local oscillations tuned to the nutation frequency of said nutating beam for developing a reference voltage and means for synchronizing said local source of oscillations with the nutation of said nutating beam by means of said submodulation receiver synchronizing signal, means for detecting the varying amplitude signal impressed on the received energy by reason of the nutation of said beam, and means for combining said reference voltage and said detected, varying amplitude signal and for deriving a resultant control voltage indicative of the sense and amount that said missile is off the nutation axis of said beam.

17. The combination set forth in claim 16, further comprising, means for moving said beam of electromagnetic energy in elevation and traverse when directing upon a target.

18. The combination set forth in claim 16 further comprising, a means for moving said beam of electromagnetic energy in elevation and traverse when directing upon a target, and means mounted in said missile for utilizing said control voltage to control said missile.

19. A control guidance system for an airborne guided missile, comprising, a transmitter situated on the ground and comprising a modulation generator, a modulator coupled to the output of said modulation generator, a radio frequency oscillator coupled to the output of said modulator, a nutating radiating element for emitting a nutating beam describing a cone of revolution of electromagnetic energy in space, means for coupling the output of said oscillator to said nutating radiating element, a synchronizing unit mechanically coupled to and synchronized with the nutation of said radiating element for deriving a receiver synchronizing signal, means for coupling the output of said synchronizing unit to said modulation generator for submodulating the signal generated by said modulation generator with said synchronizing signal thereby to establish a reference point on the cone of revolution described by said nutating beam in one nutation cycle; and a receiver mounted in said missile and comprising an electromagnetic energy pick up means, a detector coupled to said electromagnetic energy pick up means, a synchronizing channel connected to said detector output and comprising a source of local oscillations tuned to the nutation frequency of said nutating beam for developing a reference voltage and means for synchronizing said local source of oscillations with the nutation of said nutating beam by means of said submodulation receiver synchronizing signal, means for detecting the varying amplitude signal impressed on the received energy by reason of the nutation of said beam, and means for combining said reference voltage and said detected, varying amplitude signal and for deriving a resultant control voltage indicative of the sense and amount that said missile is off the nutation axis of said beam.

20. The combination set forth in claim 19, further comprising, motor means for moving said beam of electromagnetic energy in elevation and traverse when directing upon a target.

21. The combination set forth in claim 19, further comprising, means for moving said beam of electromagnetic energy in elevation and traverse when directing upon a target, and means mounted in said missile for utilizing said control voltage to control said missile.

22. A control guidance system for an airborne guided missile, comprising, a transmitter situated on the ground and comprising a square wave voltage generator, a pulse modulator coupled to the output of said square wave generator, a radio frequency oscillator coupled to the output of said modulator, a nutating radiating element for emitting a nutating beam of electromagnetic energy, means for coupling the output of said source of radio frequency oscillations to said radiating element, a synchronizing voltage generator mechanically coupled to, and synchronized with the nutation of said radiating element for deriving a repetitious, synchronizing voltage having one missing cycle in each of the series of cycles occurring during the interval of time required for one nutation of said nutating radiating element, means for coupling the output of said synchronizing generator to said modulation generator for synchronizing the output of said modulation generator with said synchronizing voltage and submodulating said modulation generator output with said missing cycle whereby the pulsed radio frequency wave emitted from said dipole has one missing pulse in each of the series of pulses occurring in one nutation cycle of said dipole; and a receiver mounted in said missile and comprising a receiving horn, a detector coupled to said horn, a synchronizing channel connected to said detector output and comprising a source of local oscillations tuned to the nutation frequency of said nutating beam for developing a reference voltage and means for synchronizing said local source of oscillations with the nutation of said nutating beam by said missing pulse, means for detecting the varying amplitude signal impressed on the received energy by reason of the nutation of said beam, and means for combining said reference voltage and said detected, varying amplitude signal and for deriving a resultant control voltage indicative of the sense and amount that said missile is off the nutation axis of said beam.

23. The combination set forth in claim 22, further comprising, means for moving said beam of electromagnetic energy in elevation and traverse when directing upon a target.

24. The combination set forth in claim 22, further comprising, a means for moving said beam of electromagnetic energy in elevation and traverse when directing upon a target, and apparatus mounted in said missile for utilizing said control voltage to control said missile.

References Cited in the file of this patent

UNITED STATES PATENTS

| | | |
|---|---|---|
| 2,165,800 | Koch | July 11, 1939 |
| 2,404,942 | Bedford | July 30, 1946 |
| 2,414,103 | Hunter | Jan. 14, 1947 |
| 2,448,007 | Ayres | Aug. 31, 1948 |
| 2,476,301 | Jenks | July 19, 1949 |
| 2,554,188 | Guanella | May 22, 1951 |
| 2,557,401 | Agins et al. | June 19, 1951 |
| 2,579,823 | Homrighous | Dec. 25, 1951 |
| 2,594,305 | Haller | Apr. 29, 1952 |
| 2,616,640 | Bedford | Nov. 2, 1952 |
| 2,638,585 | Priest | May 12, 1953 |